3,248,366
HALOGENATED POLYCARBONATES
George J. Schmitt, Bryce C. Oxenrider, and Everett E. Gilbert, Morris County, N.J., assignors to Allied Chemical Corporation, New York, N.Y., a corporation of New York
No Drawing. Filed July 3, 1963, Ser. No. 292,779
2 Claims. (Cl. 260—47)

This invention relates to new halogenated polycarbonate resins prepared from 2,2-bis(p-hydroxyphenyl)-1,1,3,3-tetrafluoro-1,3-dichloropropane and its derivatives and to processes for their preparation.

Polycarbonate resins are new thermoplastic materials with wide and successful commercial application. These resins have been found to be ideal replacements for conventional thermoplastic materials and have generally met commercial requirements. Polycarbonate resins, however, have limited stability when utilized under extraordinary thermal conditions. More specifically, it has been found that polycarbonate resins such as those derived from 2,2-bis(p-hydroxyphenyl)hexafluoropropane, when processed into fibers, elastomers, laminates, moldings, castings, translucent films and the like, exhibit limited thermal stability which, naturally, restricts their industrial application. Moreover, these polycarbonate resins possess limited sealing properties as illustrated by generally low vapor transmission resistance.

Accordingly, an object of the present invention is to provide new halogenated polycarbonate resins prepared from 2,2-bis(p-hydroxyphenyl)-1,1,3,3-tetrafluoro-1,3-dichloropropane and its derivatives which possess high thermal stability and low vapor transmission properties.

It is a further object of the present invention to provide processes for the preparation of these new halogenated polycarbonate resins.

Other objects and advantages will become apparent from the following description.

The new halogenated polycarbonate resins of the present invention are thermoplastic materials and may be defined as being comprised of recurring units of the formula:

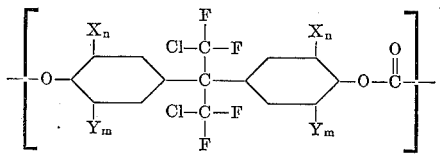

wherein X and Y are members selected from the group consisting of chlorine, bromine and alkyl radicals having from 1 to 4 carbon atoms, and $n$ and $m$ are integers from 0 to 1.

These new halogenated polycarbonate resins may be produced by a process which comprises intimately admixing a halogenated bisphenol of the formula:

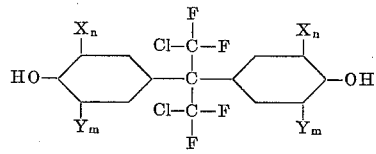

wherein X and Y are members selected from the group consisting of chlorine, bromine and alkyl radicals having 1 to 4 carbon atoms, and $n$ and $m$ are integers from 0 to 1, with phosgene in an alkaline medium and recovering the resulting halogenated polycarbonate.

Copending application Serial No. 292,740 of Gilbert et al., filed of even date, discloses and claims the halogenated bisphenol reactants and a process for their preparation.

Halogenated polycarbonate resins of the present invention are prepared by solution polymerization wherein the halogenated bisphenol is reacted with phosgene in a substantially anhydrous basic medium in the presence of an inert solvent for the resulting polycarbonate resin. Alternatively, the polycarbonate resins may be prepared by emulsion polymerization wherein the halogenated bisphenol is phosgenated in an aqueous alkaline medium in the presence of an inert water-immiscible organic solvent for the resulting polycarbonate resin.

The ratio of phosgene to halogenated bisphenol is important and should fall within the range of about 0.5 mol to about 2 mols phosgene per mol halogenated bisphenol. Theoretically, equimolar amounts of phosgene and halogenated bisphenol are required for complete conversion to the corresponding linear polycarbonate resin: however, to compensate for loss of phosgene due to side reactions, slightly more than 1 mol phosgene per mol halogenated bisphenol is normally employed. If, on the other hand, greater than a 2:1 mol ratio is employed, there is a substantial promotion of side reactions with the base employed, resulting in excessive salt contamination. Accordingly, about 1.1 to about 1.7 mols phosgene per mol halogenated bisphenol are preferably employed in order to secure maximum yields of desired molecular weight polymer. If less than 0.5 mol phosgene per mol halogenated bisphenol is employed, correspondingly less polycarbonate resin is secured, thereby tending to render the entire operation uneconomical.

As previously recited, the phosgenation of the halogenated bisphenol is carried out in a basic medium. In solution polymerization such medium is readily attained by employment of a tertiary amine such as tributyl amine, triethyl amine, pyridine or α-picoline. In emulsion polymerization, the aqueous basic medium preferably comprises an aqueous solution of an alkali metal hydroxide such as sodium, potassium or lithium. In either case, a slight excess of the basic material is employed. As previously recited, if a substantial excess of phosgene is employed, significant reaction occurs with both the tertiary amine and the alkali metal hydroxide resulting in excessive salt contamination.

Both recited procedures utilize an inert organic solvent for the halogenated polycarbonate resin. If such solvent is not employed, only low molecular weight polycarbonate resin is secured which precipitates out of solution substantially as it is found. The selection of the inert organic solvent is not critical and may be selected from chlorinated aliphatic hydrocarbons such as methylene chloride or ethylene chloride or the alkylated or halogenated derivatives of benzene, such as chlorobenzene, toluene, etc. provided the solvent is substantially inert under the conditions of reaction, possess a sufficient high boiling point to allow for reaction at elevated temperature, if desired, and, particularly in the case of emulsion polymerization, is immiscible with the aqueous alkaline solution employed. The amount of solvent may vary over a wide range but in typical operation from about 1 to 20 parts by weight per part of halogenated polycarbonate formed is generally employed.

In preferred operation from about 5 to 10 parts by weight of a chlorinated hydrocarbon such as methylene chloride or ethylene chloride is utilized in both solution and emulsion polymerization.

Of the two polymerization procedures, a refined version of emulsion polymerization process is preferred. This emulsion procedure, outlined below, has been found to produce halogenated polycarbonate resins having controlled and reproducible molecular weights. Briefly stated, this procedure comprises the partial phosgenation of the halogenated bisphenol in order to secure an intermediate derivative having chloroformate end-groups. Upon securing this intermediate derivative, a post-phosgenation molecular weight growth period is then carried out. Rapid molecular growth may be effected by admixing the chloroformate intermediate with a second reaction mixture comprised of an aqueous solution of controlled alkalinity, an inert organic solvent and a suitable onium catalyst.

It should be noted that the degree of alkalinity employed during phosgene addition and the subsequent post-phosgenation molecular weight growth period is critical. More specifically, it has been found that the aqueous alkaline solution employed in the first step of the present process should contain from about 1.5 to 2.5 mols alkali metal hydroxide per mol halogenated bisphenol in order to produce the chloroformate intermediate. An amount less than 1.5 mols alkali metal hydroxide per mol halogenated bisphenol is insufficient to convert the halogenated bisphenol to its corresponding bisphenate which, in turn, reacts with phosgene to produce the chloroformate derivative, whereas alkali present in excess of 2.5 mols per mol halogenated bisphenol effect hydrolysis of the intermediate chloroformate derivative, thus inhibiting the obtainment of high molecular weight polymer.

Upon obtaining the intermediate chloroformate derivative of the subject halogenated bisphenol by employing the above-recited controlled alkali conditions, the post-phosgenation growth period is instituted. For rapid and high molecular polymer growth the pH of the reaction mixture must be at least about 10 and no more than about 12. To attain the desired alkalinity, additional alkali metal hydroxide is added as a solid or if desired, in the form of a solution. If the pH of the reaction mixture is less than 10, the onium molecular growth catalyst is not sufficiently activated, while a pH in excess of 12, once again, effects hydrolysis.

The onium catalyst utilized in emulsion polymerization may be selected from the group consisting of ammonium, phosphonium or arsonium halides or hydroxides which may be represented by the general formula:

$$[ZR_1R_2R_3R_4]^+X^-$$

wherein Z is selected from the group consisting of nitrogen, phosphorus and arsenic and $R_1$, $R_2$, $R_3$, and $R_4$ are the same or different radicals and are selected from the group consisting of alkyl, aryl and aralkyl, and X is a member selected from the group consisting of chlorine, bromine, iodine, fluorine, and hydroxyl.

Illustrative examples of these catalysts include tetraphenyl ammonium chloride, triphenylmethyl ammonium bromide, benzyltriethyl ammonium chloride, diphenyldibenzyl ammonium hydroxide, tetraphenyl arsonium chloride, triethylphenyl arsonium fluoride, tetramethyl arsonium hydroxide, tetraphenyl arsonium iodide, tetraphenyl phosphonium fluoride, triphenylbenzyl phosphonium bromide, triethylbenzyl phosphonium iodide, tetraethyl phosphonium hydroxide, and the like.

The post-phosgenation molecular weight growth period is carried out by the addition of the additional alkali and onium catalyst to the original reaction mixture or, if desired, the reaction mixture is allowed to settle and the aqueous phase drawn off and discarded. If the latter procedure is utilized, the additional alkali and catalyst is added in the form of an aqueous solution. The onium catalyst may be added either before or concurrently with the additional alkali, however, in preferred operation, it is added just prior to increasing the pH of the reaction mixture to about 10 to 12.

In both solution and emulsion polymerization procedures, the reaction temperature employed is not critical and may vary over a wide range, i.e., from about the freezing point to the boiling point of the reaction mixture. In typical operation, reaction temperatures ranging from about 0 to 100° C. may be employed, but it is preferred that temperatures from about 15 to 30° C. be utilized in conjunction with reaction times ranging from about 5 minutes to 10 hours.

The phosgenation of the reaction mixture containing the halogenated bisphenol is normally extended over a period from about 15 minutes to 4 hours in order to minimize the deleterious effects of exothermic reaction. The slow addition of phosgene enables more accurate control of reaction temperature and also minimizes and, in some instances, completely eliminates the necessity of utilizing heat dissipating equipment. If desired, the phosgene may be diluted with an inert gas such as carbon monoxide, argon, or nitrogen, in order to prevent any atmospheric oxidation of the reaction mixture or its components.

Conventional chain terminators may be employed in order to control molecular weight. Typical examples of terminators are phenol, p-cumyl phenol, p-N-methyl acetamidophenol, chlorophenol, nonyl alcohol, butyl alcohol, etc. Discontinuance of molecular weight growth of the polycarbonate is effectively accomplished when the chain terminator is introduced during the post-phosgenation period in the case of emulsion polymerization. This enables obtainment of a polycarbonate of controllable and reproducible molecular weight. Molecular weight control is highly desirable since it is known that certain useful properties of polycarbonates such as, for example, the extent of solubility in organic solvents, and processability in plastics fabricating equipment, are dependent, at least in part, upon the molecular weight.

Various additives may be employed such as antioxidants, additives to prevent the decomposition of phosgene and additives to preferentially react with phosgene decomposition products. Typical of such additives are sodium dithionite, potassium bisulfite, carbon monoxide, etc.

The polycarbonate resins of the present invention, as exemplified by 2,2 - bis(p - hydroxyphenyl) - 1,1,3,3-tetrafluoro-1,3-dichloropropane polycarbonate resin, possess the important properties of dimensional stability and retention of strength at higher temperatures than commercially available polycarbonate resins. A particularly outstanding property of the subject polycarbonate resins is their resistance to moisture vapor transmission which render them uniquely useful when utilized as films, sheets, coatings, and the like. Also, this high resistance to vapor transmission, when considered in combination with the outstanding electrical insulating properties of the subject polycarbonate resins, produces an excellent electrical coating and molding material. Further, these polycarbonate resins are stable in the melt, and, therefore, may be processed with conventional plastic fabricating equipment to produce shaped articles which are dimensionally stable and retain their strength. Since the polycarbonate resins of the present invention are soluble in a variety of solvents, such as ethylene chloride, methylene chloride, pyridine, acetone, and the like, they may be readily be processed to produce coatings, fibers, films, etc.

The following examples are given for the purpose of illustrating the present invention. In the examples parts are by weight.

EXAMPLE 1

18.45 parts of 2,2,-bis(p-hydroxyphenyl)-1,1,3,3-tetrafluoro-1,3-dichloropropane were dissolved in a solution of 3 parts of sodium hydroxide in 200 parts of deionized water while maintaining a temperature of 20° C. and an atmosphere of nitrogen over the reacting system. 267 parts of methylene chloride were then dispersed in the reaction system and phosgene introduced into the reaction mixture until the pH of the reaction system was reduced to a level of about 6 which was effected in about 15 minutes. 1.3 parts benzyltriethyl ammonium chloride in the form of a 10 percent by weight aqueous solution and 4 parts of sodium hydroxide were then added to the reaction mixture, and the mixture stirred for one hour. Additional phosgene was then slowly introduced into the reaction mixture until a marked increase in viscosity was obtained and concentrated hydrochloric acid added until the mixture was acidic. The organic phase containing 2,2 - bis(p - hydroxyphenyl) - 1,1,3,3 - tetrafluoro - 1,3-dichloropropane polycarbonate resin in solution was separated and 134 parts of methylene chloride added followed by washing with water until the wash water contained no trace of chloride. The polycarbonate was precipitated by addition of the polycarbonate solution to 1368 parts of rapidly agitated heptane. 16.9 parts of 2,2 - bis(p - hydroxyphenyl) - 1,1,3,3 - tetrafluoro - 1,3-dichloropropane polycarbonate resin having an inherent viscosity of 0.74 and a flow point of 295° to 315° C. were recovered by filtration.

EXAMPLE 2

24.4 parts of 2,2-bis(p-hydroxyphenyl)-1,1,3,3-tetrafluoro-1,3-dichloropropane were dissolved in a solution of 3.5 parts of sodium hydroxide in 200 parts of deioinzed water while maintaining a temperature of 20° C. and an atmosphere of nitrogen over the reaction system. 267 parts of methylene chloride were then dispersed in the reaction system and phosgene introduced into the reaction mixture until the pH of the reaction mixture was reduced to about 6. The temperature of the reaction mixture was maintained at about 20° C., under constant stirring, for a period of 30 minutes. 1.3 parts of benzyltriethyl ammonium chloride in the form of a 10 percent by weight aqueous solution and 4 parts of sodium hydroxide were then added to the reaction mixture and stirring continued for one hour while maintaining the temperature at 20° C. Additional phosgene was then introduced into the mixture at a slow rate until the pH was reduced to about 6 and an additional 4 parts of sodium hydroxide added with stirring over a 45 minute period. 267 parts of methylene chloride were then added to the mixture, and the organic phase separated and washed with four successive portions of water, dilute aqueous hydrochloric acid solution and again with successive portions of water until the water wash had a pH of 6. 2,2 - bis(p - hydroxyphenyl) - 1,1,3,3 - tetrafluoro-1,3-dichloropropane polycarbonate resin was precipitated by dropwise addition of the washed methylene chloride solution to 1710 parts of vigorously stirred heptane. After separation by filtration, the polycarbonate resin was dried at a temperature of 110° C. and under vacuum of about 1.0 mm. Hg, 23 parts of 2,2-bis(p-hydroxyphenyl) - 1,1,3,3 - tetrafluoro - 1,3 - dichloropropane polycarbonate having an inherent viscosity of 0.54 and a flow point of 230° C. were obtained.

EXAMPLE 3

18.0 parts of 2,2-bis(p-hydroxyphenyl)-1,1,3,3-tetrafluoro-1,3-dichloropropane were dissolved in a solution of 4.5 parts of sodium hydroxide in 200 parts of deionized water while maintaining a temperature of 20° C. and an atmosphere of nitrogen over the reaction system. 267 parts of methylene chloride were then added with stirring and phosgene introduced into the agitated mixture until the pH of the reaction mixture was reduced to about 6 while maintaining the temperature at 20° C. 0.6 part of benzyltriethyl ammonium chloride in the form of a 10 percent by weight aqueous solution was added to the mixture and then 4 parts sodium hydroxide dissolved in 200 parts of water until the reaction mixture had a pH of 10 to 11. The organic phase separated within 5 minutes. After acidification of the reaction mixture with hydrochloric acid and the addition of 802 parts of methylene chloride, the organic phase was separated and washed with 3 successive portions of water. The polycarbonate was precipitated by slow addition of the washed polymer solution to 1368 parts of rapidly stirred heptane. After removal by filtration, the product was dried at a temperature of 80° C. under vacuum of about 117 mm. Hg, 10 parts of 2,2-bis(p-hydroxyphenyl)-1,1,3,3-tetrafluoro-1,3-dichloropropane polycarbonate resin having an inherent viscosity of 1.47 were obtained.

The following example illustrates use of phenol as chain terminator in the preparation of 2,2-bis(p-hydroxyphenyl)-1,1,3,3-tetrafluoro - 1,3 - dichloroprane polycarbonate resin.

EXAMPLE 4

An emulsion polymerization procedure was conducted in the same manner as Example 3 with the exception that 0.02 part of phenol was added after the addition of the catalyst solution and prior to addition of the aqueous sodium hydroxide solution. After stirring the reaction mixture thus obtained at 20° C. for a period of about 1 to 1½ hours and recovering the product in the usual manner, 2,2 - bis(p-hydroxyphenyl)-1,1,3,3-tetrafluoro-1,3-dichloropropane polycarbonate resin having an inherent viscosity of 0.38 was obtained. When 0.047 part of phenol was used 2,2-bis(p-hydroxyphenyl)-1,1,3,3-tetrafluoro-1, 3 - tetrafluoro-1,3,-dichloropropane polycarbonate resin having an inherent viscosity of 0.26 was obtained.

The infrared spectra of 2,2-bis(p-hydroxyphenyl)-1,1, 3,3 - tetrafluoro-1,3-dichloropropane polycarbonate resin showed strong absorption bands at 5.6, 8–9 and 12–12.5 microns. The spectra showed a typical carbonyl absorption of a polycarbonate at 5.6 microns, aromatic substitution in the 12 to 12.5 micron region $CF_2Cl$ group frequency in the 8 to 9 micron region and an absence of OH (of the monomer) near 3.0 microns.

X-ray and differential analysis showed that the polycarbonate resin was non-crystalline. It possesses an unexpectedly high specific gravity of 1.520 gm./cc. The polycarbonate resin exhibited a glass transition temperature of about 190° C. as measured by ASTM Method 1043. The polycarbonate resin was heated to temperatures up to 250° C. without any loss in weight or evolution of halogen or halides.

EXAMPLE 5

19.8 parts of 2,2-bis(p-hydroxy-3-methylphenyl)-1,1,3, 3-tetrafluoro-1,3,-dichloropropane are dissolved in a solution of 4.5 parts of sodium hydroxide in 200 parts of deionized water while maintaining a temperature of 20° C. and an atmosphere of nitrogen over the reaction system. 267 parts of methylene chloride are then added with stirring and phosgene is introduced into the agitated mixture until the pH of the reaction mixture is reduced to about 6 while maintaining the temperature at 20° C. 0.6 part of benzyltriethyl ammonium chloride in the form of a 10 percent by weight aqueous solution is added to the mixture and then 4 parts sodium hydroxide are dissolved in 200 parts of water until the reaction mixture has a pH of 10 to 11. After acidification of the reaction mixture with hydrochloric acid and the addtion of 802 parts of methylene chloride, the organic phase is separated and washed with 3 successive portions of water. The 2,2-bis(p-hydroxy-3-methylphenyl) - 1,1,3,3 - tetrafluoro-1,3-dichloropropane polycarbonate is precipitated by slow addition of the washed polymer solution to 1368 parts of rapidly stirred heptane.

EXAMPLE 6

21.4 parts of 2,2-bis(p-hydroxy-3-chlorophenyl)-1,1,3, 3-tetrafluoro-1,3-dichloropropane are dissolved in a solution of 4.5 parts of sodium hydroxide in 200 parts of deionized water while maintaining a temperature of 20° C. and an atmosphere of nitrogen over the reaction system. 267 parts of methylene chloride are then added with stirring and phosgene is introduced into the agitated mixture until the pH of the reaction mixture is reduced to about 6 while maintaining the temperature at 20° C. 0.6 part of benzyltriethyl ammonium chloride in the form of a 10 percent by weight aqueous solution is added to the mixture and then 4 parts sodium hydroxide are dissolved in 200 parts of water until the reaction mixture has a pH of 10 to 11. After acidification of the reaction mixture with hydrochloric acid and the addition of 802 parts of methylene chloride, the organic phase is separated and washed with 3 successive portions of water. The 2,2-bis(p-hydroxy-3-chlorophenyl) - 1,1,3,3 - tetrafluoro-1,3-dichloropropane polycarbonate is precipitated by slow addition of the washed polymer solution to 1368 parts of rapidly stirred heptane.

The following examples show preparation of a fiber and film from 2,2-bis(p-hydroxyphenyl)-1,1,3,3-tetrafluoro-1,3-dichloropropane polycarbonate resin.

EXAMPLE 7

20 parts of 2,2-bis(p-hydroxyphenyl) - 1,1,3,3 - tetrafluoro-1,3-dichloropropane polycarbonate resin having an average inherent viscosity of about 0.6 were dissolved in 118 parts of methylene chloride. The resulting viscous solution was then extruded at 23° C. with a small ram extruder through a die containing 5 orifices of 0.008 inch in diameter into a bath of methanol at 23° C. to produce a continuous, smooth and translucent strand of five filament fiber at a rate of about 25 feet per minute.

EXAMPLE 8

Solutions containing 10 to 15 parts of 2,2-bis(p-hydroxyphenyl) - 1,1,3,3 - tetrafluoro - 1,3-dichloropropane polycarbonate resin and 85 to 90 parts of methylene chloride were spread into a film on glass plates by means of a doctor blade. After removal of the solvent by exposing the cast film at 23° C. for about 1 to 4 hours, then heating at about 50° C. for about 2 hours and finally heating under vacuum at 25° C. to 50° C. for about 40 to 72 hours, smooth transparent 1.5 to 2.0 mil thick films of high clarity were obtained.

The following data illustrate the excellent dimensional stability and electrical insulating properties of films of the subject polycarbonate resins. These data were obtained on films prepared from 2,2-bis(p-hydroxyphenyl)1,1,3,3-tetrafluoro - 1,3 - dichloropropane polycarbonate resin, as described above.

Table I, set forth below, contains data illustrating the excellent dimensional stability of films of the polycarbonate resins of this invention as compared with films of the commercially available Bisphenol-A polycarbonate, and were obtained in accordance with test procedure ASTM D882.

Table I

| Test | Temp., °C. | DCTFP [1] | BPA [2] |
|---|---|---|---|
| Ultimate Elongation, percent | 25 | 34 | 178 |
|  | 175 | 139 | 51 |
|  | 190 | 192 | Nil |
| Ultimate Tensile Strength, p.s.i. | 25 | 9,200 | 10,500 |
|  | 175 | 4,200 | 283 |
|  | 190 | 2,600 | Nil |
| Yield Elongation, percent | 25 | 7 | ND |
|  | 175 | 8 | ND |
|  | 190 | 5 | Nil |
| Yield Point, p.s.i. | 25 | 9,500 | 7,900 |
|  | 175 | 2,700 | ND |
|  | 190 | 1,200 | Nil |

[1] 2,2-bis(p-hydroxyphenyl)-1,1,3,3-tetrafluoro-1,3-dichloropropane polycarbonate resin.
[2] Bisphenol-A polycarbonate resin.
ND—Not Determined.

Table II, set forth below, contains data illustrating the excellent electrical insulating properties of films of the present polycarbonate resins in comparison with films of Bisphenol-A polycarbonate resin.

Table II

| Test | DCTFP | BPA |
|---|---|---|
| Moisture Vapor Transmission, g./24 hr./m.[2] | 6 | 27 |
| Dielectric Strength, volts/mil | 4,500 | 3,700 |
| Dielectric Constant | 1.7 | 2.9 |
| Power Factor | 0.013 | 0.11 |

The above moisture vapor transmission and dielectric strength values were determined in accordance with test procedure ASTM E96 and ASTM 149, respectively, while the values for the dielectric constant and power factor were determined in accordance with ASTM 150.

The present invention may be embodied in other forms or carried out in other ways without departing from the spirit thereof. The scope of the invention is only limited by the appended claims.

We claim:

1. A polycarbonate resin composed of the recurring units of the formula:

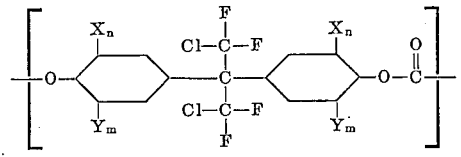

wherein X and Y are members selected from the group consisting of chlorine, bromine and alkyl radicals having from 1 to 4 carbon atoms, and $n$ and $m$ are integers from 0 to 1.

2. A polycarbonate resin composed of recurring units of the formula:

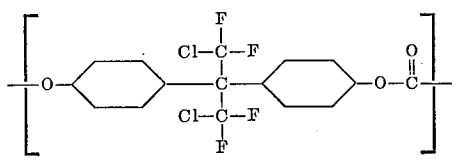

References Cited by the Examiner

UNITED STATES PATENTS 2,970,131  1/1961  Moyer et al. _____ 260—47
3,062,781  11/1962  Bottenbruch et al. ____ 260—47

FOREIGN PATENTS 1,299,933  6/1962  France.

SAMUEL H. BLECH, *Primary Examiner.*